US008202593B2

(12) United States Patent
Fischer et al.

(10) Patent No.: US 8,202,593 B2
(45) Date of Patent: Jun. 19, 2012

(54) PRINTING CARRIERS FOR TRANSFERRING CONFIDENTIAL INFORMATION

(75) Inventors: Jules Fischer, Oberwil-Liele (CH); Christian Portmann, Sins (CH)

(73) Assignee: Fofitec AG, Dottikon (CH)

( * ) Notice: Subject to any disclaimer, the term of this patent is extended or adjusted under 35 U.S.C. 154(b) by 575 days.

(21) Appl. No.: 12/355,916

(22) Filed: Jan. 19, 2009

(65) Prior Publication Data

US 2009/0286052 A1 Nov. 19, 2009

(51) Int. Cl.

| | |
|---|---|
| ***B32B 9/00*** | (2006.01) |
| ***B32B 33/00*** | (2006.01) |
| ***B32B 7/12*** | (2006.01) |
| ***B42D 15/00*** | (2006.01) |

(52) U.S. Cl. ..................... 428/40.1; 428/41.6; 428/42.1; 428/343; 428/354; 428/915; 428/916; 283/72; 283/100; 283/101; 283/114

(58) Field of Classification Search ................. 428/40.1, 428/41.6, 42.1, 343, 354, 915, 916; 283/72, 283/100, 101, 107–111, 114
See application file for complete search history.

(56) References Cited

U.S. PATENT DOCUMENTS

| | | | | |
|---|---|---|---|---|
| 5,772,248 | A * | 6/1998 | Phillips | 283/91 |
| 6,336,666 | B1 * | 1/2002 | Trantoul | 283/108 |
| 6,523,859 | B2 * | 2/2003 | Scheggetman et al. | 283/70 |

FOREIGN PATENT DOCUMENTS

| | | |
|---|---|---|
| EP | 1 293 359 | 3/2003 |
| WO | WO 99/24267 | 5/1999 |
| WO | WO 00/54984 | 9/2000 |

* cited by examiner

*Primary Examiner* — Patricia Nordmeyer
(74) *Attorney, Agent, or Firm* — D. Peter Hochberg; Sean F. Mellino; Daniel J. Smola

(57) ABSTRACT

In a printing carrier for transferring confidential information with a transparent film layer onto the front side of which the confidential information can be printed and wherein a concealing means, which considerably complicates the capability to identify the confidential information on the film layer is present behind the film layer, provision is made according to the invention for the film layer to carry on the front side at least one structure imprint, which does not add to the confidential information and which improves the effect of the concealing means due to its irregular area coverage.

21 Claims, 9 Drawing Sheets

PRINTING CARRIERS FOR TRANSFERRING CONFIDENTIAL INFORMATION

This application claims priority of Swiss Application Serial No. 00740/08 filed May 15, 2008.

BACKGROUND OF THE INVENTION

1. Field of the Invention

The invention relates to printing carriers for transferring confidential information with a transparent film layer onto the front side of which the confidential information can be printed and wherein a concealing means, which complicates the capability to identify the confidential information on the film layer is present behind the film layer.

2. Description of the Prior Art

Printing carriers comprising confidential information, e.g., personal identification numbers of bank or credit cards are often sent via mail. The confidential information must thereby be protected in such a manner that it cannot be read by third parties, or also by the sender (e.g. bank employees). The receiver for whom the confidential information is intended is also to be able to identify whether the confidential information has been read by third parties.

Printing carriers in the form of standard forms comprising a transparent film, which can be imprinted by means of a laser printer or an ink jet printer and which is glued on top of a concealing means, are known from EP 1 293 359, WO 00/54984 and WO 99/24267. A transparent separating layer, generally a silicon layer, is located between the film and the concealing means. The confidential information is printed onto the transparent film and cannot be read in transmitted light due to the concealing means located therebelow. Under normal circumstances, the confidential information can thus not be read by bank employees, e.g., who print and package the standard form. The confidential information can be identified only when the end user separates the film and the concealing means from one another at the separating layer.

However, depending on the state of the toner or of the ink, the confidential information is capable of being identified under specularly reflected light in spite of the concealing means with the known embodiments.

SUMMARY OF THE INVENTION

It is the object of this invention to ensure additional security against unauthorized reading of the confidential information.

According to the invention, using a printing carrier of the afore-mentioned type for transferring confidential information, this is attained in that the film layer carries on its front side at least one structure imprint, which does not add to the confidential information and which improves the effect of the concealing means due to its irregular area coverage.

The structured surface creates a micro-topography comprising elevations (where the structure imprint is present) and depressions (where the structure imprint is not present), wherein parts of the imprinted confidential information are covered by elevations in response to small viewing angles in the depressions, which additionally complicates unauthorized reading.

The structure imprint according to the invention can be applied with an area coverage of 15-85%, preferably with an area coverage of 30-70%.

The film layer is either a film, which can be imprinted directly, such as, e.g., an acetate film or is provided with a layer, such as, e.g., a print layer to enable or improve the imprintability thereof.

The film layer can be embodied to be glossy or matt-finished on its front side as such or by means of a layer, such as, e.g., a print layer, which is applied over the entire area, and the structure imprint can be embodied so as to be matt-finished or glossy as a function thereof, which thus results in a gloss contrast to the areas, which are not covered by the structure imprint. Due to the interplay between matt and gloss, this gloss contract causes a reflection pattern to form in the specularly reflected light. Reflections on the imprinted confidential information disappear for the eye in said reflection pattern. The unauthorized reading of the confidential information under a flat viewing angle is thus complicated and the read protection is improved.

The structure imprint according to the invention is particularly transparent. However, it can also be embodied so as to have color characteristics such as whitish, tinted or opaque, thus leading to a color contrast to the concealing means, which is present behind the film layer. The color contrast can structure a structured concealing means more strongly and can thus improve the read protection. A uniform, dark and unstructured concealing means can also appear to be structured due to a light and opaque structure imprint.

Provided that the concealing means is structured, the structure imprint can encompass a similar structuring as the concealing means.

The gloss contrast and the color contrast can be present individually or in combination. They could also be realized by means of different layers. A glossy, transparent structure imprint, e.g., could be arranged above a further opaque structure imprint.

Additionally, a toner or ink, which is suitable for the printing of the confidential information, can encompass a different affinity as compared with the structure imprint on the one hand and as compared with the areas, which are not covered by the structure imprint on the other hand. The toner or the ink of the confidential information adheres less to the areas comprising a small affinity than on the areas with a higher affinity. In response to an attempt to transfer the confidential information onto an adhesive strip, e.g., the reproduction of the toner or the ink located on the areas comprising a lower affinity are mainly created on the adhesive strip and the confidential information is not easily identifiable. However, a portion of the toner or of the ink is missing on the printing carrier and the unauthorized reading attempt is visible.

A reagent color can be used completely or partially for the structure imprint and/or another layer as further protection against an undesired identification of the confidential information. Said reagent color discolors irreversibly under the impact of heat and/or solvent and/or includes an absorber for infrared and/or ultraviolet radiation.

To reveal confidential information imprinted on the printing carrier according to the invention, the impact of the concealing means must be cancelled. For this purpose, provision can be made for a separating layer, which allows for the transparent film layer and the concealing means to be separated from one another thereon.

Preferably, at least one non-transparent separating color, which simultaneously forms the concealing means, is used for the separating layer.

The back of the separating layer can be applied to the transparent film layer and the back thereof can in turn be provided with an adhesive layer, wherein the separating layer adheres to the back of the transparent film layer with an adhesive force, which is less than its adhesive force as compared with the adhesive layer.

Furthermore, the printing carrier according to the invention is preferably a manipulation-indicative standard form or a part of such a standard form comprising a label, wherein the label comprises the transparent film layer and is glued onto a paper layer of the standard form by means of an adhesive layer.

The back of the mentioned separating layer can hereby be partially applied to the transparent film layer and the adhesive layer can project beyond the separating layer at least on one side, but preferably on all sides so that said separating layer permanently connects the film layer to the paper layer at that location and so that a fiber tear occurs in the paper at that location when the film layer is separated. Press cuts can be placed into the paper to limit or also to support the fiber tear.

At the location where the adhesive layer projects beyond the separating layer and the concealing means, a structured transparent separating varnish in particular in the form of lettering can be applied on the back of the film layer and the adhesive layer or at least a layer thereof can be colored. Upon separation, the film layer separates from the separating varnish, where it is present. However, the colored adhesive layer adheres to the film at the locations without a separating varnish and then forms the lettering.

A similar effect results when a structured transparent adhesive varnish is applied to the back of the film layer in the edge region of a separating color, which is used for the separating layer and for the concealing means. Where the adhesive varnish is present, the concealing means does not separate from the film in response to the separation of the film and forms lettering on said film again, e.g.

The transparent film layer can also consist of two layers, which are glued to one another and wherein the front of the front layer can be imprinted and the back of back layer is provided with the separating layer. This embodiment allows in particular for a format-variable embodiment of the printing carrier.

According to a further embodiment, the film layer carries on its back the concealing means, which is formed by at least one separating color; a carrier layer is present behind the film layer; an adhesive layer, which is colored at least in some of the layers, is present between the film layer and the carrier layer; a first transparent separating varnish is present on the one side of this adhesive layer substantially over the entire area; a second structured separating varnish is present on the other side of this adhesive layer in the edge region around the concealing means; the first separating varnish separates as compared with the adhesive layer, but less than the second structured separating varnish as compared with this adhesive layer or as compared with the film layer or the carrier layer. Lettering can also be generated with this embodiment in response to the separation of film layer and concealing means. The back of the carrier layer can be provided with a further adhesive layer and can be glued onto a paper layer of a standard form, e.g., by means of said adhesive layer. Press cuts are hereby not required in the standard form.

According to yet a further embodiment, a carrier layer carries on its front side the concealing means, which is embodied as a layer, wherein the color of said carrier layer differs from the color of said concealing means; the transparent film layer is glued onto the concealing means so that it can be separated at the front by means of an adhesive layer; a structured separating varnish is present between the concealing means and the carrier layer; the adhesive force between the concealing means and the adhesive layer on the one hand as well as between the concealing means and the carrier layer on the other hand is in each case greater than the adhesive force of the adhesive layer as compared with the transparent film layer and is again greater than the adhesive force of the structured separating varnish as compared with the carrier layer or the concealing means; and the cohesion of the adhesive layer is greater than the adhesive force of the adhesive layer as compared with the transparent film layer. Lettering can also be generated with this embodiment in response to the separation of film layer and concealing means, wherein the components of said lettering, however, remain on the carrier layer. The embodiment is furthermore characterized by a complete format variability.

When the printing carrier is a manipulation-indicative standard form or a part of such a standard form, provision can be made in an area of the standard form adjoining the concealing means for a contrast reference field, which encompasses the same color as the concealing means when viewed through the film layer before said film layer and the concealing means are separated from one another at the separating layer. The contrast reference field intensifies the capability to identify the contrast reduction, which appears in most of the embodiments, with reference to the appearance of the concealing means after a separation of the film layer from the concealing means.

BRIEF DESCRIPTION OF THE DRAWINGS

The invention is to be defined in more detail below by means of exemplary embodiments in combination with the drawing.

Figure 1A:
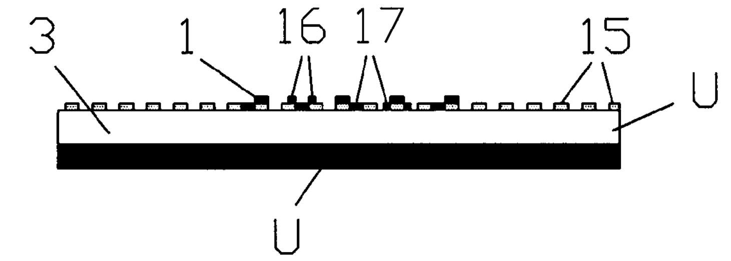
FIG. 1 shows under a)-e) embodiments of a printing carrier according to the invention comprising concealing means in sectional views.

The layer thicknesses in particular are not illustrated in a realistically thick manner in the sectional views so as to be able to better identify them. Realistic layer thicknesses lie in the range of from approx. 1-100 μm.

DETAILED DESCRIPTION OF THE PREFERRED EMBODIMENTS

FIGS. 1a-1e show in each case a printing carrier for transferring confidential information 1 with a transparent film layer 3, behind which a concealing means U is present, which forms a background, which is visible through the transparent film layer 3 and which thus at least considerably complicates the capability to identify confidential information 1, which is imprinted on the front side of the film 3, e.g., by means of laser printers or inkjet printers.

In FIGS. 1a-1e, the concealing means U is in each case applied directly to the film layer 3 as coating. However, additional non-illustrated layers could also be present between the concealing means U and the film layer 3, such as, e.g., a separating layer. The area of the concealing means U could also comprise only a partial area of the film layer 3.

In FIGS. 1a-1e, the film 3 carries in each case a structure imprint 15 on its front side. Said structure imprint 15 supports the effect of the concealing means U on the one hand, but also supplements it on the other hand and thus improves the read protection of the confidential information 1.

The structure imprint 15 forms a micro-topography comprising elevations on the film 3. Parts 16 of imprinted confidential information 1 come to lie on these elevations, while other parts 17 come to lie on the film layer 3 in the valleys therebetween. When viewed under a small angle, the parts 17 of the confidential information 1 located in the valleys are partially covered behind the elevations, which complicates the capability to identify and the readability of the confidential information 1.

The film layer 3 is embodied to be glossy or matt-finished and the structure imprint 15 is embodied to be matt-finished or glossy as a function thereof, thus resulting in a gloss contrast to the areas, which are not covered by the structure imprint 15. A matt-finished structure imprint 15 on a glossy film layer 3, e.g. a polyester film, leads to an interplay between matt-finish and gloss. The same effect appears when a glossy structure imprint 15 is applied to a matt-finished film layer 3, e.g. an acetate film.

Depending on the state of the toner or of the ink, which is used, confidential information 1, which is imprinted on a uniform surface, e.g. on an untreated film layer 3 or on a matt-finished layer, which is applied across the entire area, can be read, if necessary, in spite of the concealing means U under certain angles of view, in particular when the angle of view is the same as the angle of incidence of the light. This effect is generated by means of the different reflections of the light on the uniform surface on the one hand and on the toner or the ink on the other hand. An area with high gloss, e.g., leads to a highly directed or reflective reflection, while an area with a low gloss leads to a diffuse reflection.

An irregular reflection pattern comprising glossy and matt-finished areas, in which the different reflections which are caused by the imprinting of the confidential information 1 disappear, is generated on the surface of the printing carrier. The effect is similar to the effect of a structured concealing means U, via which the bright-dark contract of the imprinted confidential information 1 disappears in the transmitted light.

The structure imprint 15 and thus the reflection pattern can in particular be structured in the same manner as the concealing means U, provided that said concealing means U is structured.

The structure imprint 15 is in particular transparent. However, it can also be embodied so as to have color characteristics such as whitish, tinted or opaque, thus leading to a color contrast to the concealing means U, which is present behind the film layer 3. Due to its color contrast, the structure imprint can structure a structured concealing means U more strongly and can thus improve the read protection. A uniform, dark and unstructured concealing means U can also appear to be structured due to a bright and opaque structure imprint.

The gloss contrast and the color contrast can be present individually or in combination. They could also be realized by means of different layers. A glossy, transparent structure imprint, e.g., could be arranged above a further opaque structure imprint, wherein they are not area-wide, but can overlap.

Figure 1B:
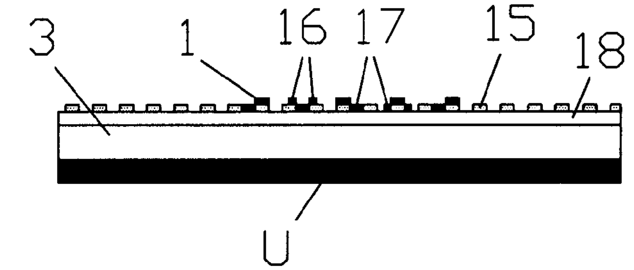

The embodiment of FIG. 1b differs from the embodiment in FIG. 1a in that a transparent layer 18, which is applied across the entire area, is located between the structure imprint 15 and the film layer 3, wherein said transparent layer 18 is embodied so as to be glossy or matt-finished and so as to generate the mentioned reflection pattern together with the structure imprint 15. The layer 18, which is applied across the entire surface, can serve as an imprintable layer on a film layer 3, which itself is not imprintable, such as, e.g., a polyester film.

Figure 1C:
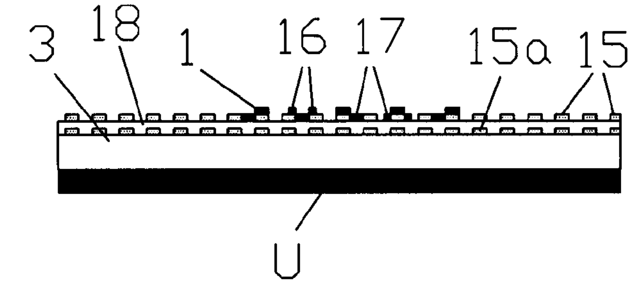

The embodiment of FIG. 1c differs from the embodiment in FIG. 1b in that a second structure imprint 15a is applied between the film layer 3 and the layer 18, which is applied across the entire area. The first structure imprint 15 thereby generates a gloss contrast and the second structure imprint 15a generates a color contrast.

Figure 1D:
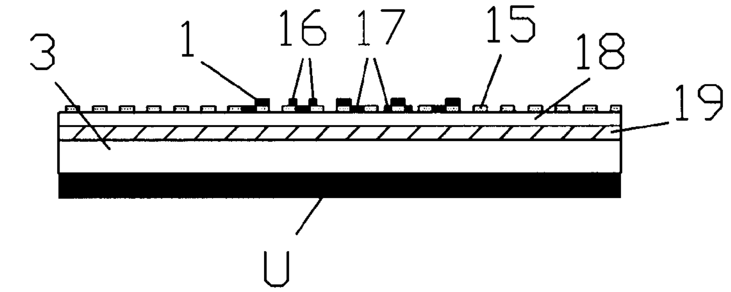

The embodiment of FIG. 1d differs from the embodiment in FIG. 1b in that a transparent separating layer 19 is located between the layer 18, which is applied across the entire area, and the film layer 3. When an unauthorized third party attempts to lift the toner used for the confidential information 1, e.g., by means of an adhesive strip and to read the confidential information on the adhesive strip, the entire layer 18, which is applied across the entire area, separates from the transparent separating layer 19 and the confidential information 1 is completely transferred onto the adhesive strip. The subsequent absence of the confidential information 1 on the printing carrier becomes immediately apparent to the person, for whom the confidential information was actually intended.

Practically the same effect is attained when the separating layer 19 separates from the film layer 3 instead of from the layer 18. On the other hand, the layer 18 could also encompass an affinity, which is directly lower as compared with the film layer 3 so that a separate separating layer 19 is not even necessary.

Figure 1E:
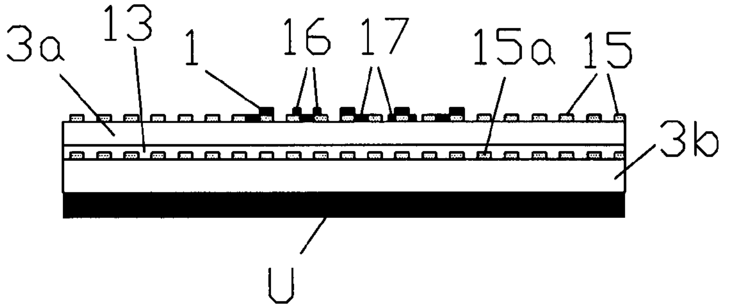

The embodiment of FIG. 1e differs from the embodiment in FIG. 1a in that the transparent film layer 3 consists of two layers 3a, 3b, which are glued together by means of a laminating adhesive 13. The structure imprint 15a is located between the two layers 3a, 3b. Additionally, the layer 3a of the film layer at the front can encompass the layer 18, which is applied across the entire area.

In all of the embodiments, the structure imprint 15 can encompass a different affinity than the areas, which are not covered by it, as compared with toner or ink. For example, the structure imprint 15 can encompass certain separating layer characteristics so that toner or ink encompasses only a small adhesion thereon. In this case, the film layer 3 or the layer 18, which is applied across the entire area, should encompass a comparatively good adhesion as compared with the toner or the ink. In an attempt to lift the toner used for the confidential information 1, e.g., by means of an adhesive strip, virtually only the parts of the toner located on the structure imprint loosen so that the presumed reproduction of the confidential information 1 on the adhesive strip encompasses considerable imperfections and the confidential information cannot be read.

In this case, the structure imprint 15 can also comprise lettering such as, e.g., VOID, as random print so that a positive reproduction of the lettering is generated on the adhesive strip. Vice versa, the unauthorized reading of the confidential information 1 can be identified on the printing carrier as a negative reproduction of the lettering, e.g., VOID.

A similar effect can be attained by using a film layer 3, such as, e.g., a polyester film, on which toner or ink adheres only comparatively faintly in combination with a structured matt-finished layer as structure imprint 15, on which toner or ink adheres to a comparatively better degree.

The effect of the partial transferring of the confidential information 1 onto an adhesive strip can also be attained in that the structure imprint 15 encompasses a lower affinity than the toner or the ink on said structure imprint and on the areas, which are not covered by it as compared to an adjoining layer, such as, e.g., as compared with the film layer 3 or as compared with the layer 18. A corresponding separation could also be provided with reference to the structure imprint 15*a* as compared with the layers 3 or 18 and could lead to the same effect.

In all of the embodiments, a reagent color, which discolors irreversibly under the impact of heat and/or solvent, can be used for the structure imprint 15, 15*a* or also for another layer such as the layers 18 or 19. The structure imprint 15, 15*a* or another layer can also include an absorber for infrared and/or ultraviolet radiation, which protects against attacks in the special light. The embodiment of FIG. 1*c* is advantageous in response to the use of a heat-sensitive reagent color as second structure imprint 15*a*, because it is arranged so as to be protected under the layer 18, which is applied across the entire area, and does not already discolor in response to the temperatures occurring in laser printers. This applies to the layer 15 in FIG. 1*e*, which is arranged so as to be protected under the film layer 3*a*.

Figure 2A:
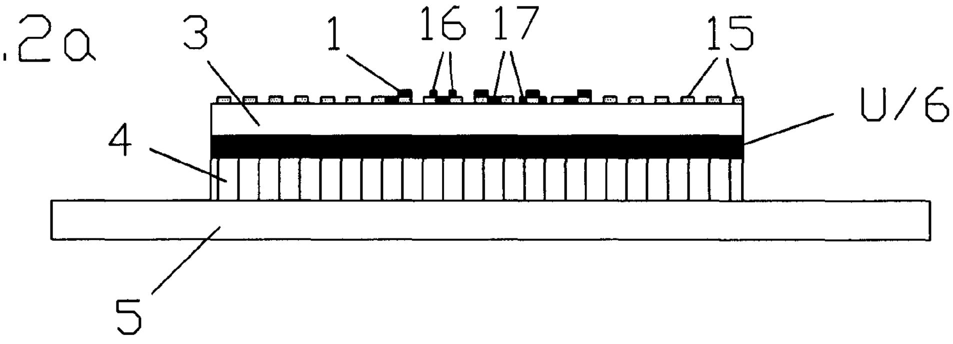
FIG. 2 shows under a)-d) a printing carrier according to the invention as a part of a standard form comprising a label in a sectional view, wherein the concealing means has a different embodiment.

To reveal confidential information, which is imprinted on the printing carrier according to the afore-described embodiments, the effect of the concealing means U must be cancelled. For this purpose, the film layer 3 can be embodied so as to be capable of being separated from the concealing means U. Furthermore, as is shown in FIG. 2*a*, the back of the concealing means U can be provided with an adhesive layer 4 and can be glued onto a paper surface of a standard form 5 by means of this adhesive layer 4 according to the type of a label in a particularly permanently adhering manner. In this arrangement, the film layer 3 can be detached from the concealing means U, wherein the concealing means U remains on the adhesive layer 4 and the confidential information becomes readable on the film layer 3.

Provision can be made between film layer 3 and the concealing means U for a transparent separating layer to allow the film layer 3 to be separated from the concealing means U. However, a non-transparent separating color layer 6, as it is also shown in FIG. 2*a*, can also be used for the concealing means U.

Preferably, this separating color layer 6 further comprises the characteristic that it can no longer connected to the transparent film layer 3 after it has been separated therefrom. A separation of the film layer 3 for the unauthorized reading of the confidential information 1 can thus not simply be reversed and remains capable of being identified.

In FIG. 2*a*, the concealing means U is embodied so as to be unstructured, uniformly dark across the entire area. Nevertheless, the interaction with the structure imprint 15*a* in this case leads to a sufficient concealing effect for the confidential information. However, the concealing means U itself can also be embodied to be structured. Different alternatives for the structuring and improvement of the concealing means U are illustrated in FIGS. 2*b*-2*d*.

Figure 2B:
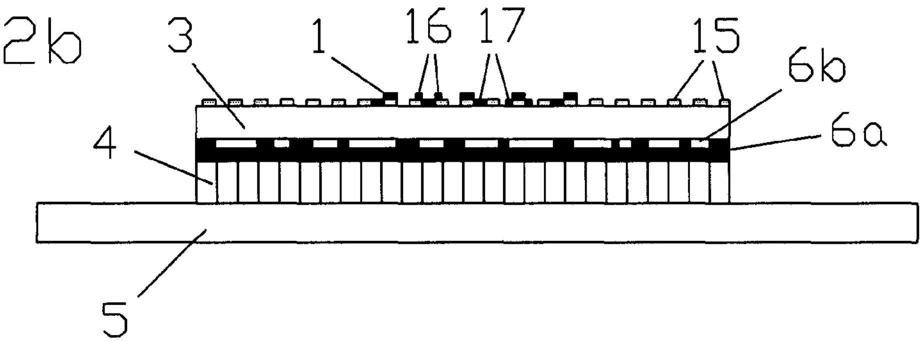

In the alternative of FIG. 2*b*, a second separating color layer 6*b* for the concealing means is combined with the first dark separating color layer 6*a*, which is applied across the entire area. The second separating color layer 6*b* is a structured bright separating color and is located above the dark separating color layer 6*a*, when viewed from the front side, which is applied across the entire area. The structured bright separating color layer 6*b* is applied, e.g. with an area coverage of 20-50% with reference to the dark separating color layer 6*a*. The structured separating color layer 6*b* has the same adhesive characteristics as the separating color layer 6*a*, which is applied across the entire area. When separating the film layer 3, the structured separating color layer 6*b* also separates from the film layer 3.

Figure 2C:
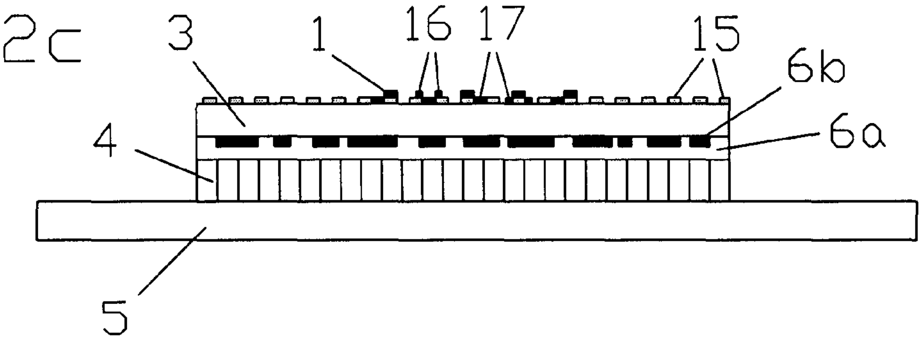

The alternative of FIG. 2*c* differs from the alternative of FIG. 2*b* in that the characteristics of the two separating color layers 6*a*, 6*b* in terms of color are embodied in reverse. The structured separating color layer 6*b* is dark herein and the separating color layer 6*a*, which is applied across the entire area, is bright or even transparent, wherein the dark separating color layer 6*b* is applied, e.g. with an area coverage of 50-80%.

Figure 2D:
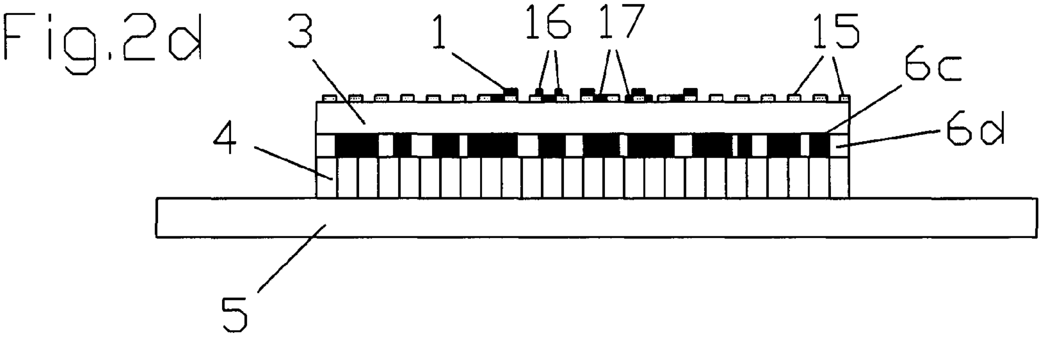

In the alternative illustrated in FIG. 2*d*, the concealing means 6 consists of two separating color layers 6*c*, 6*d*, which are colored differently, which are each structured and which complement one another to 100% with reference to their area coverage. The darker one of the two covering colors is preferably applied with an area coverage of 50-80%.

In the subsequent figures, the concealing means U is illustrated to be partly structured and partly unstructured. However, it is to be understood in such a manner that one of the other afore-described alternatives can in each case also be used.

Figure 3A:
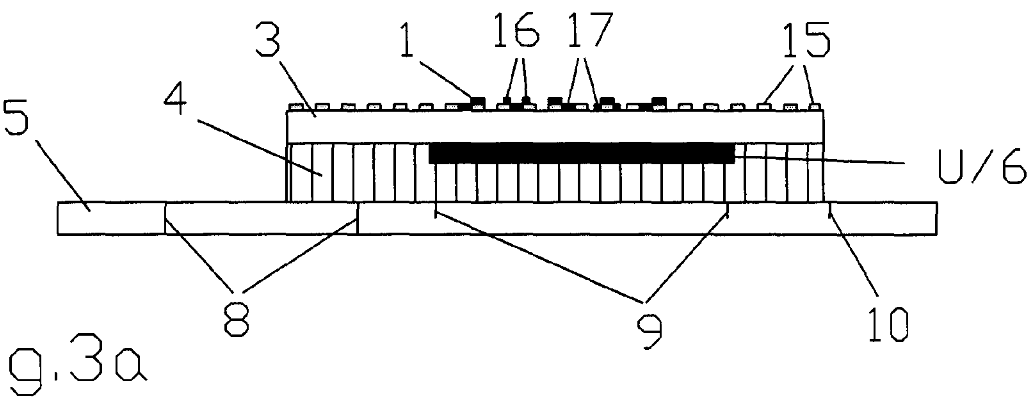
FIG. 3 shows a printing carrier according to the invention as a part of a manipulation-indicative standard form comprising a label in a sectional view (3*a*), in a top view (3*b*) and in a sectional view after the confidential information has been identified (3*c*)
Figure 3B:
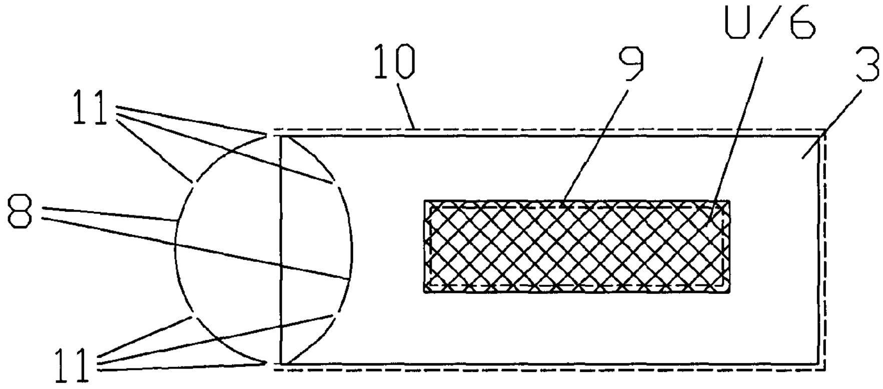
Figure 3C:
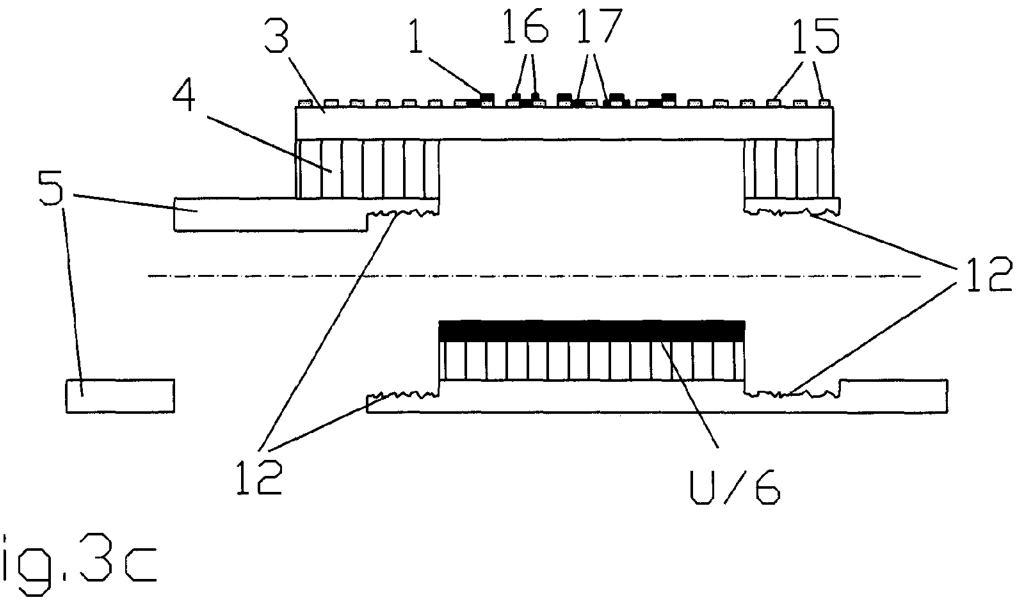

The embodiment of FIG. 3*a*-3*c* show a printing carrier as part of a standard form 5, wherein, contrary to the embodiment of FIG. 2*a*, the concealing means U is applied in the form of a separating color layer 6 on the back side of the transparent film layer 3 so as to cover only a part of the area. On the other hand, the back side of the film layer 3 is provided with an adhesive layer 4, which projects beyond the concealing means, across the entire area, as illustrated, or at least towards one side. The film layer 3 is glued onto a paper layer of the standard form 5 by means of said adhesive layer. The permanent adhesion cannot be dissolved in a non-destructive manner so that the paper layer of the standard form 5 frays out when the film layer 3 is lifted, as it is shown in FIG. 3*c*. The fiber tear represents an efficient safety feature, by means of which the attempt of an unauthorized third party to read the confidential information 1 by separating the film layer 3 can be identified subsequently.

To prevent the expansion of the fiber tear 12 in response to the separation of the film layer 3 into the area of the separating color layer 6, at least one perforation 9 is applied as tear stop means along an edge zone of the separating color layer 6 in tear direction in front thereof. The fiber tear 12 is thus stopped and the separating color layer 6 can separate from the film layer 3. Preferably, the perforation 9 has a depth of approximately half of the thickness of the paper layer of the standard form 5, but can also be deeper or less deep. The perforation 9 does not completely extend through the paper layer and nothing can thus be pushed between the separating color layer 6 and the film layer 3 so as to thus make the confidential information readable.

To facilitate the separation of the transparent film layer 3, a flap 8 can be partially cut out in the standard form paper 5, wherein a part of the flap 8 is located below the film layer 3, but not below the separating color layer 6 and a part of the flap 8 projects beyond the film layer 3. Bars 11 hold the flap 8 in the plane of the standard form paper 5. This can be seen in FIG. 3*b*. By breaking through the bars 11, the flap 8 can be bent upwards out of the standard form plane, it can be picked up with two fingers and can be used as handle for separating the film layer 3.

A perforation or the perforation 9, respectively, should be present in this case at least along the separating color layer 6 on the same side as the flap 8. When the separating color layer 6 forms an approximately rectangular surface, as viewed from the front as is illustrated in FIG. 3*b*, provision can additionally be made along the longitudinal sides of the rectangular surface for perforations, which prevent the expansion of the fiber tear 12 from the sides into the area of the separating color layer 6. As can be seen in FIG. 3*b*, a further perforation 10 is applied from the front side of the standard form paper 5 at least partially along the film layer 3, but not below said film layer 3, so as to also prevent an expansion of the fiber tear 12 into the area outside of the film layer 3. All of the perforations 9, 10 and the cut for the flap 8 can be applied in the front side of the standard form paper 5 in one operating step using web finishing.

To embody a tear stop means, the adhesive force between the transparent film layer and the paper layer of the standard form can also be reduced or cancelled. The tear stop means, e.g., can be formed by means of an adhesive-free zone, a separating paper layer or by means of a different separating layer. If applicable, it is not necessary to perforate the standard form paper. The tear stop means is located in the label and can be glued directly onto a standard form by means of said label. This can considerably facilitate the production of manipulation-indicative standard forms comprising a label.

When using an adhesion-free zone or a silicon paper strip as separating aid, it may be necessary to apply a marking means to facilitate the creation of the desired fiber tear. Such a marking means is, e.g., a perforation in the standard form paper in tearing direction directly behind the separating aid and in front of the tear stop means. The marking means can also be combined with a flap.

Figure 4A:
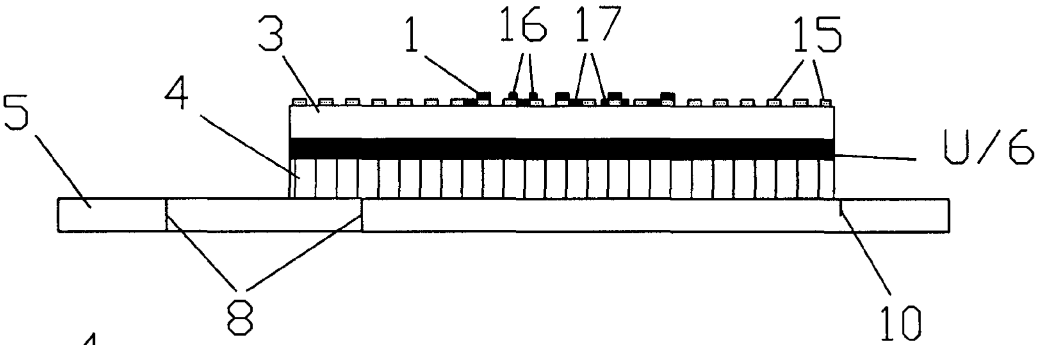
FIG. 4 shows a printing carrier in an illustration according to FIG. 3, wherein the film layer is glued onto the standard form at two edge regions, which are located opposite one another.
Figure 4B:
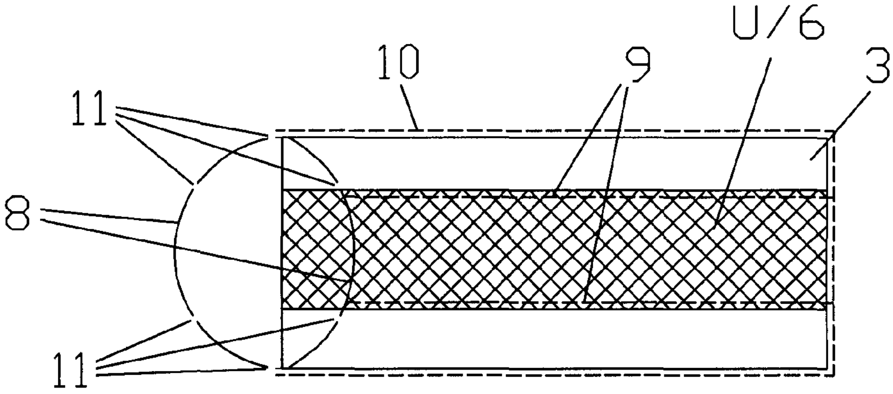
Figure 4C:
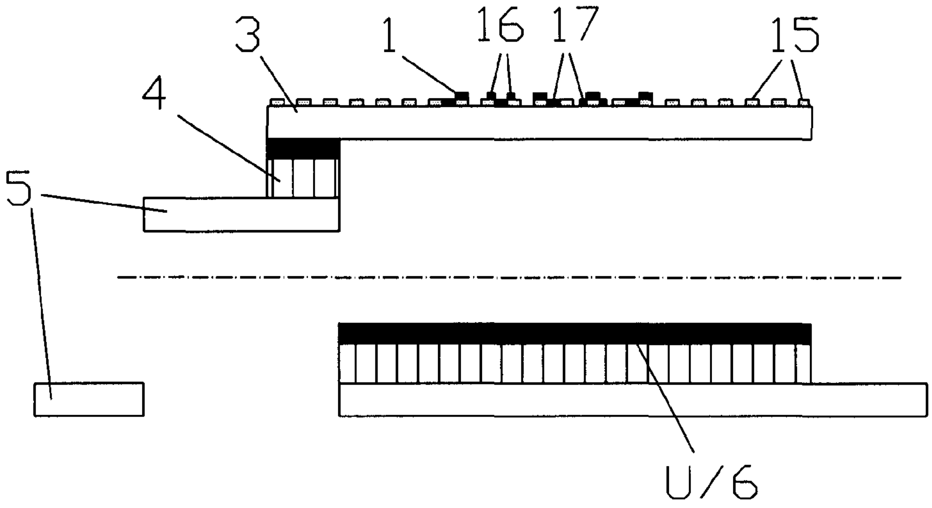

The embodiment of FIG. 4*a*-4*c* differs from the embodiment in FIG. 3*a*-3*c* in that the film layer does not encompass a concealing means only at two edge regions located opposite one another and that it is permanently glued onto the paper layer 5 of the standard form at that location. Due to this embodiment, the length of the label is not established and, depending on the length of the confidential information 1 which is to be imprinted, the label can be trimmed variably by means of an endless sheet.

Figure 5A:
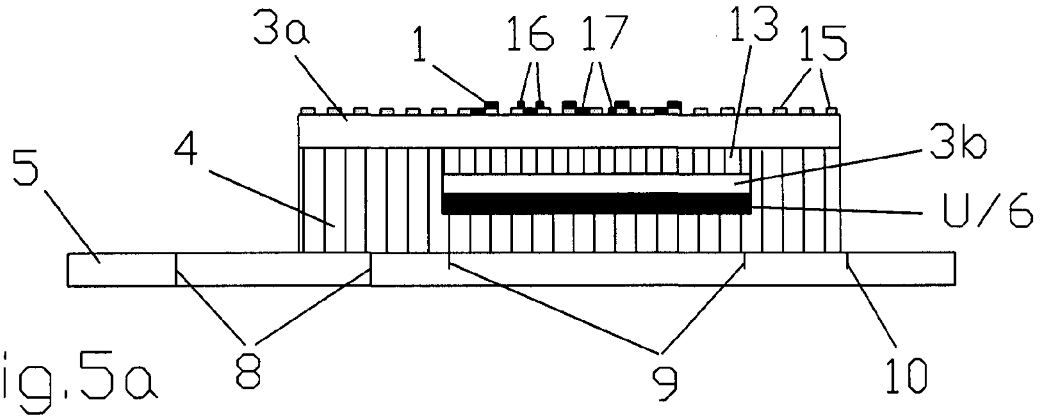
FIG. 5 shows a printing carrier in an illustration according to FIG. 3, wherein the film layer is embodied in two layers.
Figure 5B:
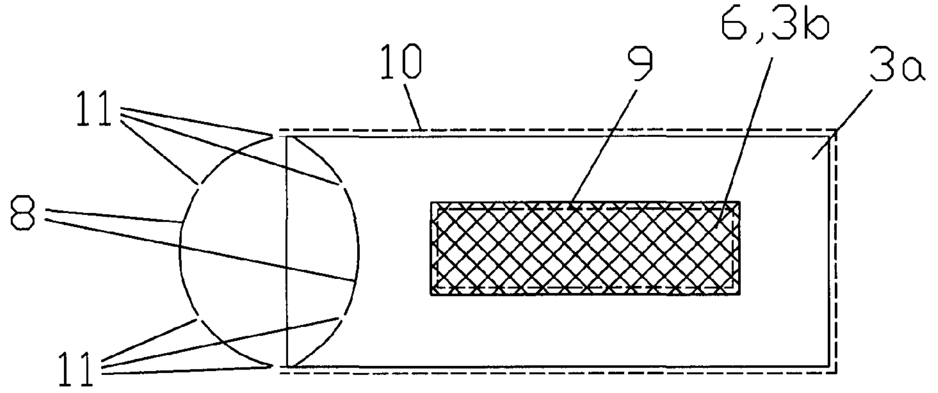
Figure 5C:
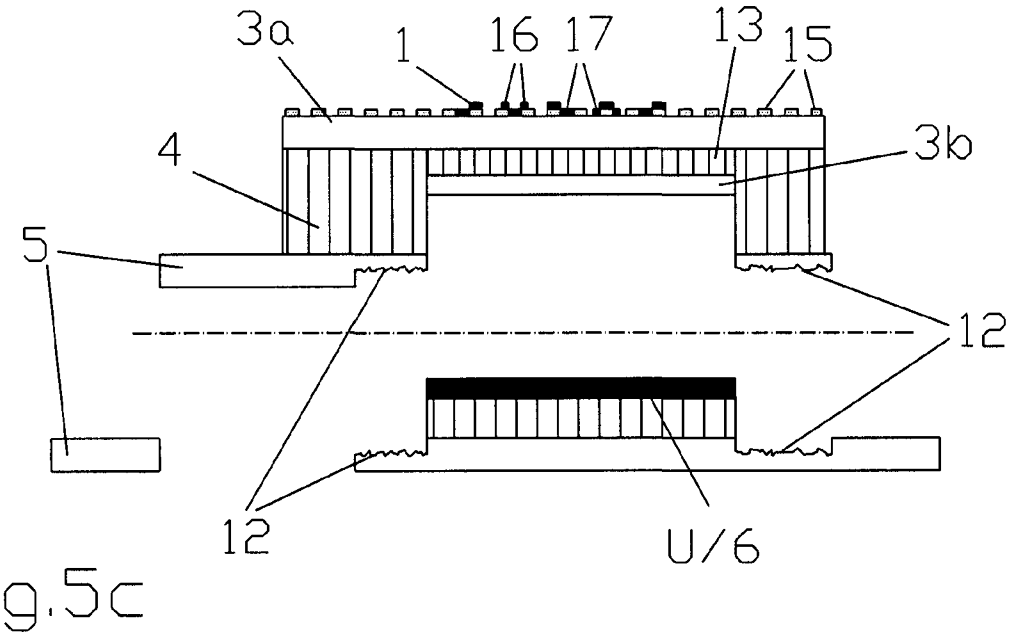

The embodiment illustrated in FIG. 5*a*-5*c* differs from the embodiment of FIG. 3-3*c* in that the transparent film layer 3 consists of two layers 3*a*, 3*b*, wherein the upper layer 3*a* can be imprinted on the front side and the lower layer 3*b*, which is smaller by area and the back side of which is provided with the separating color layer 6 as the concealing means U, is glued to the upper layer 3*a* by means of an adhesive layer 13. The same configuration is attained when the adhesive layer 4 is used for gluing to the two film layers 3*a*, 3*b* to one another and when the adhesive layer 13 is used for connecting the separating color layer 6 to the paper layer of the standard form 5. In this case, it is also possible to only glue the lower layer 3*b* comprising the separating color layer 6 and the adhesive layer 13 on the back onto a standard form paper in a first step and to then glue the upper layer 3*a* on top thereof by means of the adhesive layer 4 only in a second step. In response to a uniform embodiment of the two layers with reference to the area thereof, it is possible to cut them out from a larger piece of material in each case only directly prior to the adhesion, thus attaining a high degree of flexibility with reference to the size of the concealing means U and the entire label in length and width.

Figure 6A:
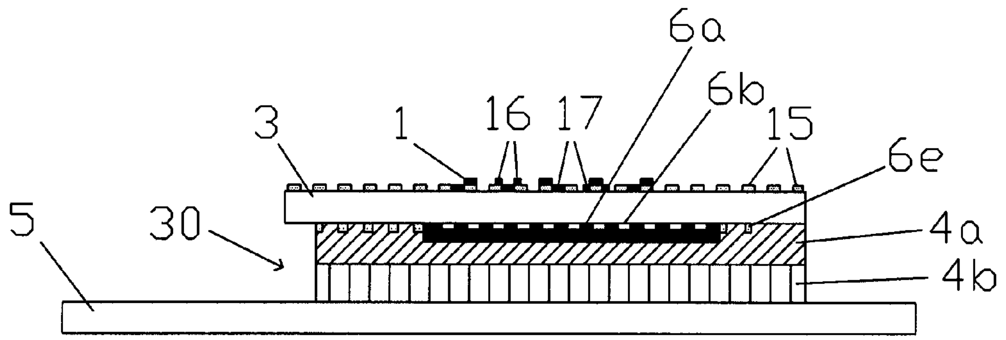
FIG. 6 shows a printing carrier in an illustration according to FIG. 3 comprising a first version of lettering VOID, which is generated in response to an unauthorized manipulation.
Figure 6B:
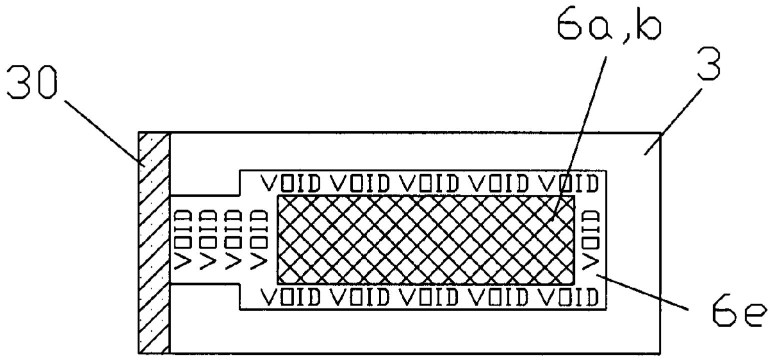
Figure 6C:
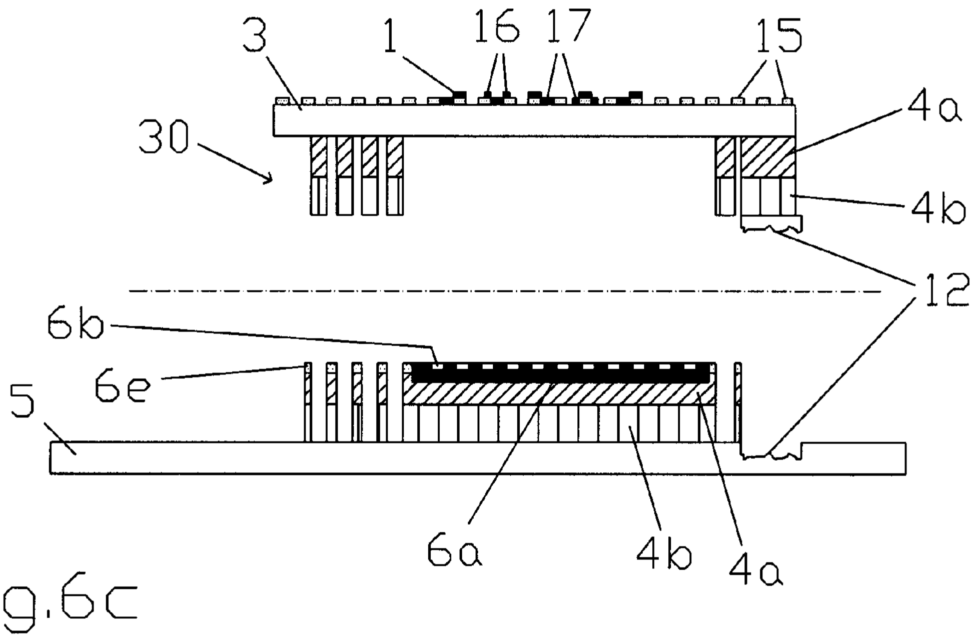

In the embodiment of FIG. 6*a*-6*c*, a structured transparent separating varnish 6*e* is applied to the back of the film layer 3 around the area of the concealing means, which is formed herein by means of the separating colors 6*a*, 6*b*. The separating varnish 6*e* has approximately the same adhesive characteristics as the separating colors 6*a*, 6*b* as compared with the film layer 3. The structured transparent separating varnish 6*e* is applied in such a manner that the locations at which no separating varnish 6*e* is present form lettering, e.g., VOID. The back of the film layer 3 comprising the separating colors 6*a*, 6*b* and the separating varnish 6*e* is provided with an adhesive layer, wherein the adhesive layer consists of a layer 4*a* on the side of the film and a layer 4*b* on the side of the standard form. The layer 4*a* of the adhesive layer on the side of the film is colored bluish, e.g.

When the film layer 3 is lifted, it also separates from the colored layer 4*a* of the adhesive layer on the film side at those locations, where the separating varnish 6*e* is located, except for in the area of the concealing means. At the locations without separating varnish 6*e*, the colored layer 4*a* of the adhesive layer on the side of the film continues to adhere to the film layer 3, whereby the VOID lettering becomes visible on the separated film.

Substantially the same result is attained when the separation between the separating varnish 6*e* and the adhesive layer 4*a* were to take place in response to the separation of the film layer 3. The VOID lettering encompasses a maximum area coverage of approximately 20% and the separating varnish correspondingly encompasses an area coverage of more than 80%. Due to the fact that the locations where no separating varnish 6*e* is present are thus relatively small, the layer 4*b* of the adhesive layer on the side of the standard form separates from the standard form paper 5 at that location, without generating a fiber tear 12. However, as can be seen in FIG. 6*c* at the right-hand edge of the film layer 3, the standard form paper 5 is frayed out when the film layer 3 is lifted in the area where no separating varnish 6*e* and separating color layer 6*a*, 6*b* is not present in larger connected areas.

To facilitate the lifting of the film layer 3, an adhesive-free zone 30 is present in FIG. 6*a*-6*c* along an edge zone of the film layer. A similar separation aid is generated when, prior to the labeling of the illustrated configuration as adhesive label onto the paper carrier 5 of the standard form on a silicon carrier, the silicon paper carrier is cut by several millimeters on the inside from the edge of the label and is peeled off in response to the labeling in such a manner that a narrow edge strip remains on the label and the film layer cannot adhere to the standard form paper in the area of this edge strip. These embodiments of separating aids could basically also be used in all other embodiments and could in particular be provided instead of the flap 8, which is illustrated in FIGS. 3-5.

The area of the film layer 3, which is located between the adhesion-free zone 30 and the concealing means, is also provided in FIG. 6*a*-6*c* with the structured transparent separating varnish 6*e* in the form of lettering such as VOID. Due to the fact that, as specified above, the paper material does not fray in the areas where this lettering is present in response to the separation of the film layer 3, tear stop means, e.g. a perforation, are not necessary here in tear direction in front of the concealing means.

In the embodiment of FIG. 6*a*-6*c*, it is also possible to use a structured transparent separating color layer 6*b* in combination with a dark separating color layer 6*a*, which is applied across the entire area, in the area of the concealing means. In this case, it is possible for the transparent separating color layer 6*b* and the transparent separating varnish 6*e* to consist of the same material, which could simultaneously also be applied to the film layer 3.

The VOID lettering could also be formed by the separating varnish 6*e* itself, that is, by the locations where separating varnish 6*e* is present. In this case, the area coverage by means of the separating varnish 6*e* should, at most, be 20%. The small area coverage of the separating varnish 6*e* is thereby not sufficient to separate the layer 4*a* of the adhesive layer on the side of the film from the film layer 3 in response to a conventional lifting of the film layer 3. This thus leads to a fiber tear in the standard form as in the example of FIG. 3. As in this example, at least one stop perforation is also required to limit the fiber tear. Authorized lifting of the film layer 3 thus does not make it possible to identify the VOID lettering. However, as soon as an attempt is made, e.g., to penetrate between the film layer 3 and the concealing means by means of a thin knife, the VOID lettering becomes visible.

As is the case with the layer 4*c* in FIG. 8, the two-layer adhesive layer 4*a*, 4*b* could also be embodied in one layer, wherein this one layer is then colored.

Figure 7:
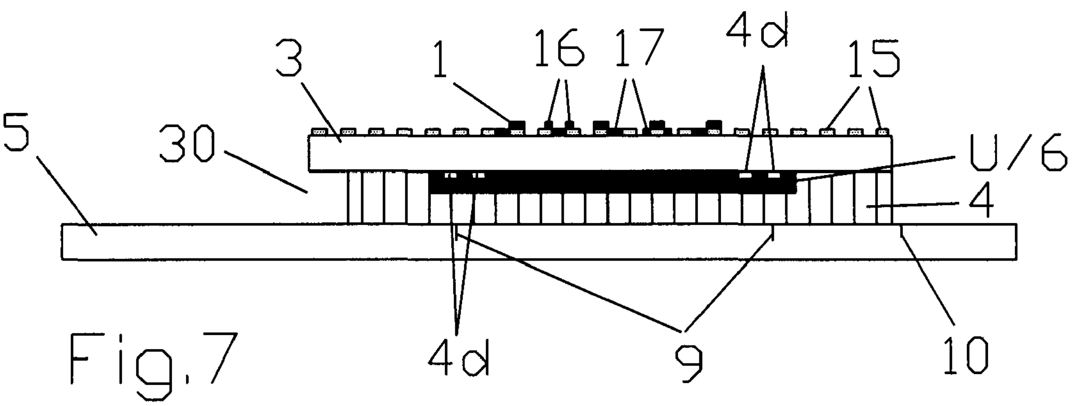
FIG. 7 shows a printing carrier in a sectional view as a part of a standard form comprising a second version of lettering VOID, which is generated in response to an unauthorized manipulation.

FIG. 7 shows an embodiment of a printing carrier as part of a standard form 5, where a structured transparent adhesive varnish 4*d* is applied to the back of the film layer 3 in the edge region of a separating color layer 6, which is also used for the concealing means U in such a manner that the locations where said adhesive varnish is present, form a lettering, e.g. VOID. When the film layer 3 is separated, it separates from the separating color layer 6, except for at the locations where the adhesive varnish 4*d* is located. Said adhesive varnish goes with the film and in turn takes along the separating color layer 6 located under said adhesive varnish so that the lettering VOID can be identified on the separated film.

In the example of FIG. 7, the film layer could also be coated with the separating color layer 6 across the entire area.

Figure 8A:
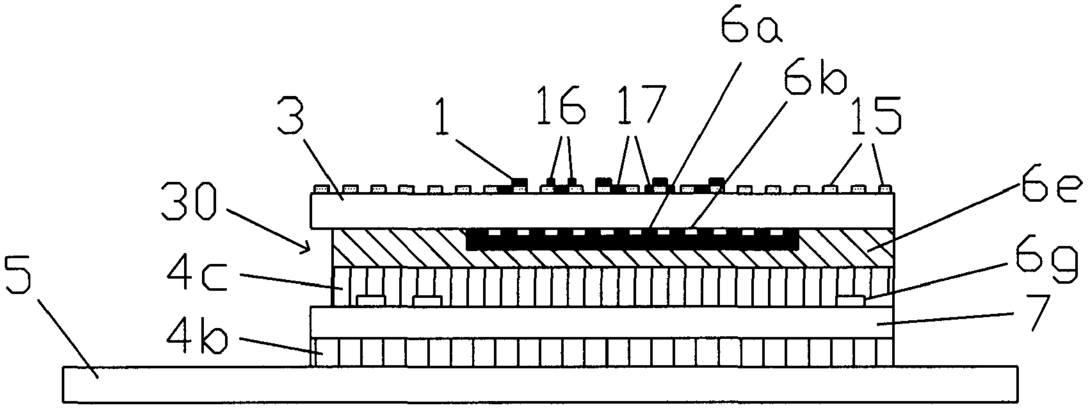
FIG. 8 shows a printing carrier in two sectional views as a part of a standard form comprising a third version of lettering VOID, which is generated in response to an unauthorized manipulation.
Figure 8B:
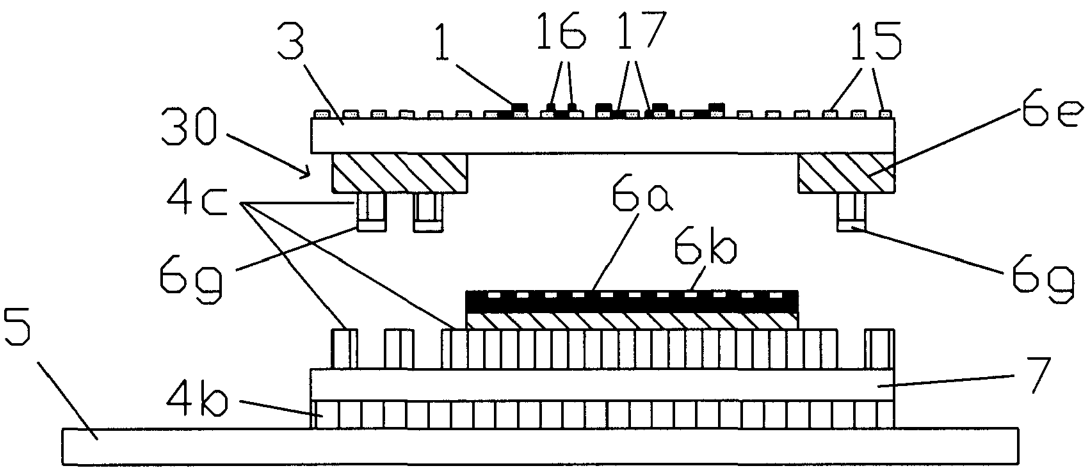

FIGS. 8*a* and 8*b* show a printing carrier as part of a standard form, where the film layer 3 carries on its back the concealing means, which is formed by means of the separating color layers 6*a*/6*b* and is furthermore coated with a first transparent separating varnish 6*e* across the entire area. A carrier layer 7 made of paper or film carries a second structured separating varnish 6*g* on its front side in the edge region around the concealing means and therabove across the entire area, except for a separating zone 30, an adhesive layer 4*c*, which is colored bluish, e.g. and which is in contact with the first separating varnish layer 6*e*. The locations where the second separating varnish 6*g* is present form lettering, e.g. VOID. The separating varnish 6*g* separates as compared with the carrier layer 7, namely slighter than the adhesive layer 4*c* as compared with the first separating varnish layer 6*e*. The carrier layer 7 is glued onto the front of a paper layer of the standard form 5 by means of a second adhesive layer 4*b*.

When the film layer 3 is lifted at the adhesion-free zone 30, e.g., the separation runs the area of the concealing means between the separating color layers 6*a*/6*b* and the film layer 3, as is illustrated in FIG. 8*b*. Outside of the area of the concealing means, the separation runs at the location where no second separating varnish 6*g* is present, between the first separating varnish 6*e* and the adhesive layer 4*c*. At the location where the second separating varnish 6*g* is present outside of the concealing means, the separation runs between said second separating varnish and the carrier layer 7. The second separating varnish 6*e* and the colored adhesive layer 4*c* located thereabove go along with the film and form the mentioned lettering on said adhesive layer 4*c*.

The separating varnish 6*g* could also separate as compared with the adhesive layer 4*c*. As in the example of FIG. 6, the adhesive layer 4*c* could also be made up of two layers, wherein only one of the layers is colored. In this case, the separation could take place in a quasi cohesive manner, also between the two layers. Preferably, the surfaces of the adhesive layer 4*c*, which are exposed in response to a separation, are dry, that is, they are not adhesive.

The first separating varnish 6*e*, which is substantially holohedral and the second structured separating varnish 6*g* could also be interchanged with one another with reference to their position, wherein the second structured separating varnish 6*g* would be applied to the back side of the film layer 3 and would result in a structure similar as in FIG. 6*a*-6*c*. The structure of the structured separating varnish 6*g* with reference to the formation of the lettering, e.g. VOID, could thereby also be inverted.

In the embodiment of FIGS. 8*a* and 8*b*, perforations are not necessary in the standard form 5 due to the foundation of the label from the layers 7 and 4*b*.

Figure 9A:
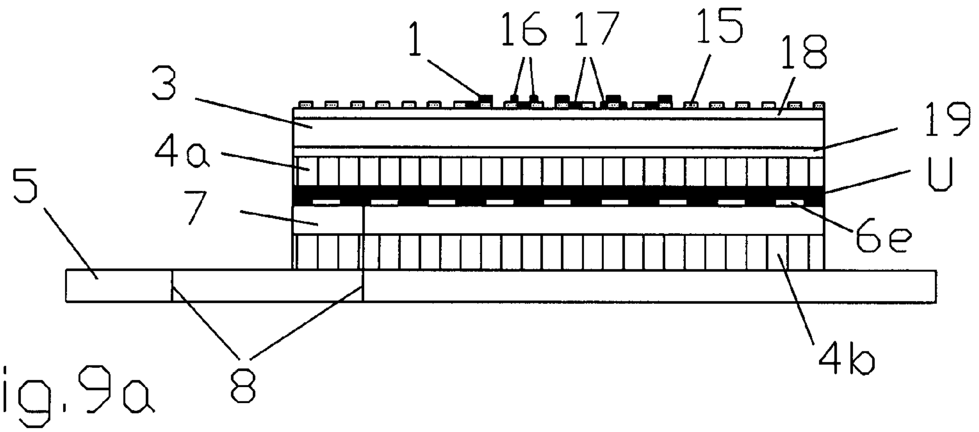
FIG. 9 shows a printing carrier according to the invention as part of a standard form comprising a label in a sectional view (3*a*), in a top view (3*b*) and in a sectional view after the confidential information has been identified (3*c*), wherein a fourth version of lettering VOID, which is generated in response to an unauthorized manipulation, is used here.
Figure 9B:
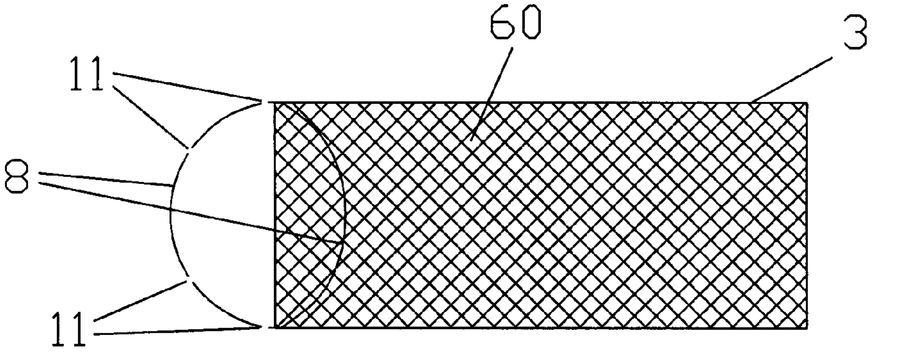
Figure 9C:
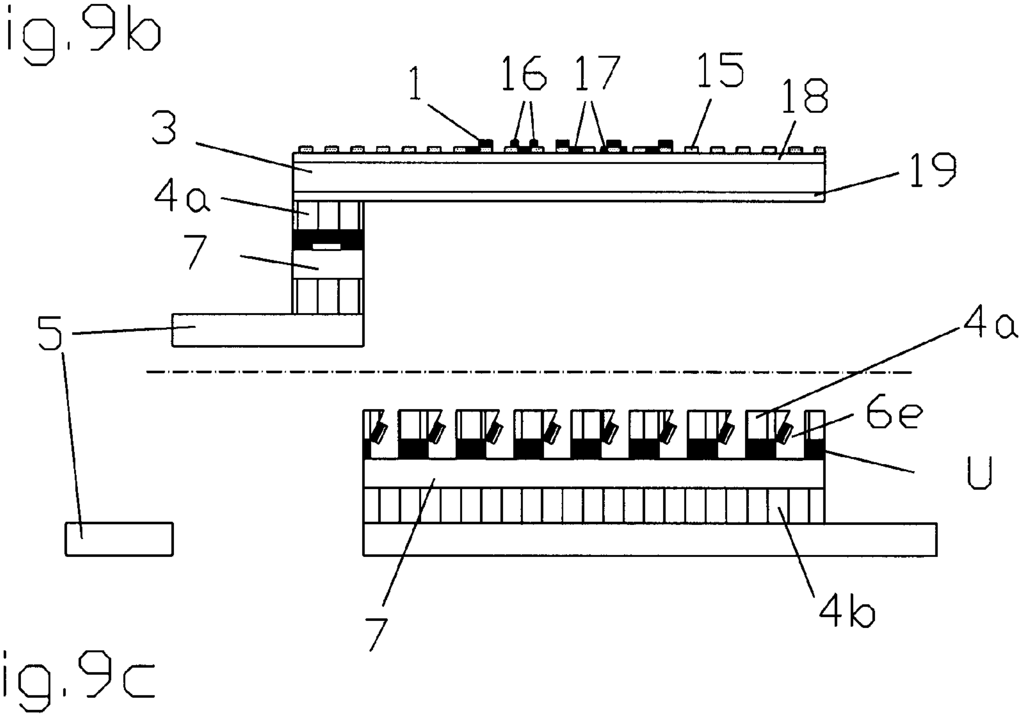

FIG. 9*a*-9*c* show a printing carrier as part of a standard form 5, where all of the layers of the printing carrier (of the label) are embodied to have the same size and to be uniform across the entire surface. The printing carrier can thus be trimmed and/or cut out from a larger piece, in particular an endless sheet, at will and is thus completely format-variable. A carrier layer 7 from paper or film carries on the front side the concealing means U in the form of a coating across the entire area and differs therefrom in color. The transparent film layer 3 is glued to the front side of the concealing means U by means of a first transparent adhesive layer 4*a*, namely in that the film layer 3 can again be separated from the adhesive layer 4*a*. Provided that the adhesive layer 4*a* itself does not allow for this separability, provision can additionally be made for this purpose for a transparent separating layer 19, which separates as compared with the film layer 3 or the adhesive layer 4*a*. The adhesive layer 4*a* furthermore has a certain inner cohesion as well as certain elastic characteristics, which will be discussed below. The carrier layer 7 is glued onto the front side of a paper layer of the standard form 5 by means of a second adhesive layer 4*b*. Confidential information 1 cannot be determined before the transparent film layer 3 and the concealing means U are separated from one another at the adhesive layer 4*a* and at the separating layer 19, respectively.

A structured separating varnish 6*e* with an area coverage of 20% to 50% by means of which lettering, e.g. VOID is formed, is present between the concealing means U and the carrier layer 7. The adhesive force between the concealing means U and the first adhesive layer 4*a* on the one hand as well as between the concealing means U and the carrier layer 7 on the other hand is in each case greater than the adhesive force of the first adhesive layer 4*a* as compared with the transparent film layer 3. This adhesive force in turn is greater than the adhesive force of the structured separating varnish 6*e* as compared with the carrier layer 7 or the material of the concealing means U. The cohesion of the first adhesive layer 4*a* is greater than its adhesive force as compared with the transparent film layer 3.

To facilitate the separation of the transparent film layer 3, a flap 8 is again provided. The cut in the area of the flap 8, which is located below the film layer 3, reaches through the carrier layer 7 herein so that the film layer 3 can be separated from the carrier layer 7 adhering to the standard form 5 and thus from the concealing means U when the flap 8 is lifted. When the film layer 3 can be separated relatively easily from its foundation in response to a suitable adjustment of the afore-mentioned adhesive forces, it is also possible to do without the flap 8 or a different separating aid in this exemplary embodiment.

When the film layer 3 is lifted consecutively from left to right, the separating varnish 6*e* initially separates from the carrier layer 7. However, due to the mentioned elastic characteristics of the first adhesive layer 4*a* and the cohesion thereof, the separated separating varnish pieces 6*e* and the areas of the concealing means U, which cover said separating varnish pieces 6*e*, are not completely removed from the carrier layer 7, but are lifted only briefly and are then shifted slightly to the side, as is illustrated in FIG. 9*c*, due to the lateral draw at the film layer 3. The first adhesive layer 4*a* then completely separates from the film layer 3 and from the separating layer 19, respectively. Due to the lateral shift of the separating varnish pieces 6*e* and of the areas of the concealing means covering them, the lettering, e.g. VOID, can be identified by means of the difference in color between the concealing means U and the carrier layer 7 located therebelow. The shift of the separating varnish pieces 6*e* cannot be reversed. The shift remains and the lettering becomes visible in particular when the film layer 3 is glued back onto the standard form. The effect is thus a very effective means for making it possible to identify an unauthorized reading.

The somewhat same effect is attained when a structured adhesive varnish is used instead of a structured separating varnish 6*e* and when the concealing means U is embodied as a separating color, e.g., and separates as compared with the carrier layer 7. It would be sensible in this case to additionally invert the structure of the structured adhesive varnish with reference to the lettering.

Where provided, the lettering can appear either positively or negatively on the separated film layer in all of the embodiments, wherein positive means that the characters forming the lettering are displayed so as to be dark in a bright environment. Accordingly, negative means vice versa that the characters forming the lettering are displayed so as to be bright in a dark environment.

The described embodiments on the back side of the film layer according to FIGS. 2-9 are described independent on the design of the front side of the film layer, as is described by means of FIG. 1, for example, and could in this respect also form an independent inventive concept when refraining from the described advantageous, but possibly dispensable combinatory effect of the structure imprint on the front side in interaction with the concealing means U at the back side.

Figure 10A:
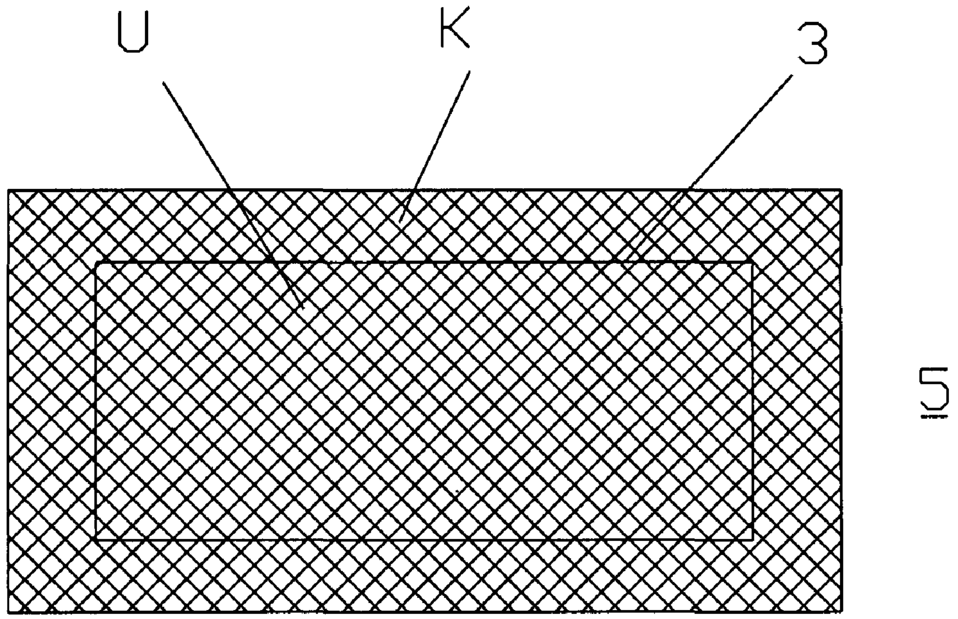
FIG. 10 shows a printing carrier according to the invention in a top view on a standard form comprising a contrast reference field in original state (10*a*) and after separating the film layer of the printing carrier (10*b*).
Figure 10B:
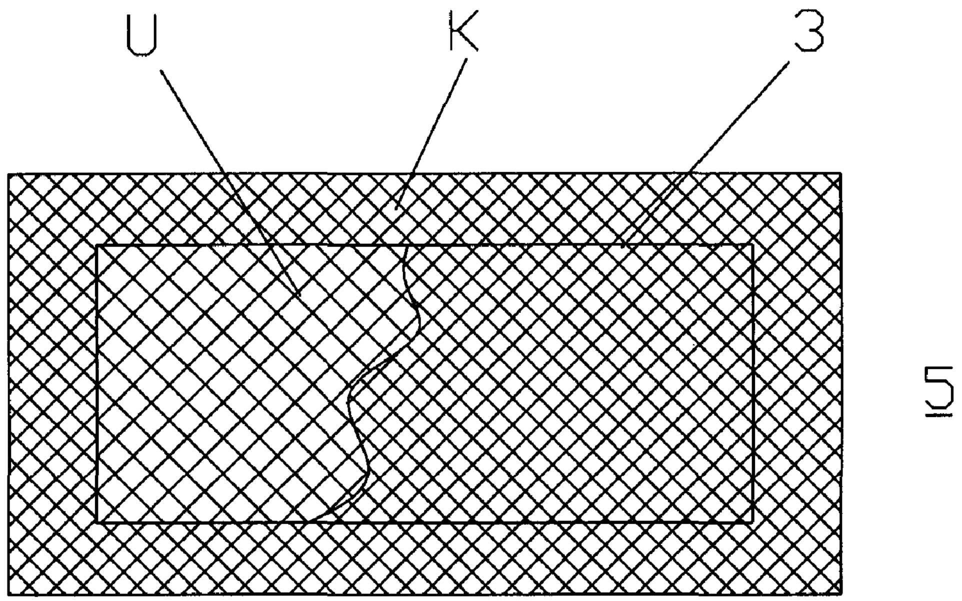

In all embodiments a contrast reference field K can be present additionally and as illustrated for example in FIG. 10*a*. Said contrast reference field K directly adjoins the film layer 3 and/or the concealing means U and corresponds according to type and mainly contrast to the concealing means U, which is visible through the film layer 3, in fact as long as the film layer 3 is still originally connected to the concealing means U. This is so, because this typically leads to a contrast reduction with reference to the appearance of the concealing means U, as is shown in FIG. 10*b* in response to the separation of the film layer 3 from the concealing means U, wherein the film layer 3 in FIG. 10*b* was separated in the left part of the concealing means U. The effect can no longer be reversed by a simple reconnection of the two layers and is all the more pronounced, the higher the degree of the matt-finish on the surface of the printing carrier and the lower the degree of gloss thereof, respectively. On the one hand, the contrast reference field K amplifies the capability to identify this effect and allows for the contrast reduction to also be capable of being identified when it was uniformly effected on the entire area of the film layer 3 and/or of the concealing means U.

The contrast reference field K can be applied onto the paper carrier 5 of a standard form, e.g., by means of a printing technique and could also extend into the area of the concealing means U or could actually be applied holohedrally.

The contrast reference field can also be considered to be an independent inventive concept.

The confidential information 1 or 16 and 17, respectively, was only mentioned, illustrated and described in the afore-described example for a better understanding of the invention. However, it does not form a part of the invention, which is directed to a printing carrier as such. As a rule, the confidential information is also added only in a last separate processing step—e.g., by a bank in the case of a PIN code of a credit card—whereas the printing carrier as such according to the invention is produced by a manufacturer, who specializes in this.

The invention claimed is:

1. A printing carrier for transferring confidential information, said printing carrier comprising:

a transparent film layer having a front side and a rear side;

a selection from the group consisting of no layers or at least one layer located on said front side of said transparent film layer;

at least one structure imprint being carried by said transparent film layer and being located directly on said front side of said transparent film layer in the event there are no layers on said front side and located on said at least one layer in the event there is at least one layer on said front side of said transparent film layer, said at least one structure imprint having an irregular area coverage leaving areas of said front side of said transparent film layer or said at least one layer uncovered;

an upper surface adapted to receive the confidential information by imprinting and including said at least one structure imprint, and the areas of said transparent film layer not covered by said at least one structure imprint in the event there are no layers on said front side, and the areas of said at least one layer not covered by said at least one structure imprint in the event there is at least one layer on said front side of said transparent film layer; and a concealing means having a first color and being located underneath said rear side of said film layer, said concealing means being adapted to complicate the capability to identify the confidential information on said upper surface;

wherein said at least one structure imprint improves the effect of said concealing means due to the irregular area coverage.

2. The printing carrier according to claim 1, wherein said front side of said film layer comprises a matt appearance or a matt finish and wherein said at least one structure imprint has a glossy appearance.

3. The printing carrier according to claim 1 wherein said at least one structure imprint is transparent.

4. The printing carrier according to claim 1 wherein said at least one structure imprint has a color, said color creating a color contrast to the color of said concealing means.

5. The printing carrier according to claim 1 wherein said at least one structure imprint further comprises a first affinity vis-à-vis toner or ink suitable for printing the confidential information;

wherein the area of said upper surface not covered by said at least one structure imprint comprises a second affinity vis-à-vis the toner or ink; and wherein said second affinity is different from said first affinity.

6. The printing carrier according to claim 1 wherein said concealing means further has a second color, and wherein at least one of said first color and said second color includes a partial area coverage being substantially the same as said irregular area coverage of said at least one structure imprint.

7. The printing carrier according to claim 1 further comprising:

a separating layer having a front side and a rear side, wherein said transparent film layer and said concealing means are capable of being separated from one another at said front side of said separating layer.

8. The printing carrier according to claim 7 and further comprising:

at least one non-transparent separating color for the separating layer, said at least one non-transparent separating color simultaneously forming said concealing means.

9. The printing carrier according to claim 8, wherein said rear side of said film layer carries said concealing means, said concealing means being formed by said at least one separating color layer, said printing carrier further comprising:

a carrier layer located behind said film layer;

an adhesive layer having two sides, said adhesive layer or a portion of the adhesive layer being colored and being located between said film layer and said carrier layer;

a first transparent separating varnish substantially present across the entire area on one of said two sides of said adhesive layer; and a second structured separating varnish present on the other side of said adhesive layer near said concealing means, wherein said first separating varnish separates less easily from said adhesive layer than said second structured separating varnish separates from said adhesive layer, said film layer or said carrier layer.

10. The printing carrier according to claim 7 and further comprising:

an adhesive layer applied to said rear side of said separating layer.

11. The printing carrier according to claim 10 and further comprising:

a paper layer; and a label comprising said transparent film layer, said label being glued onto said paper layer by said adhesive layer.

12. The printing carrier according to claim 11 wherein said adhesive layer projects beyond said separating layer and permanently connects said film layer to said paper layer.

13. The printing carrier according to claim 12, further comprising:

a structured transparent separating varnish partially applied to the rear side of said film layer in an area where said adhesive layer projects beyond said separating layer and said concealing means and wherein said adhesive layer or a portion of said adhesive layer thereof is colored.

14. The printing carrier according to claim 11 further comprising:

a contrast reference field encompassing the same color as said concealing means when viewing said concealing means through said film layer before said film layer and said concealing means are separated from one another at said separating layer, said contrast reference laterally adjoining said concealing means.

15. The printing carrier according to claim 7 wherein said transparent film layer further comprises:

a front layer having a front, said front layer being adapted to receive the confidential information by imprinting on said front; and a back layer having a back, said back layer being provided with said separating layer on the back.

16. The printing carrier according to claim 7 further comprising:

a separating color layer having an edge region, said separating color layer used for said separating layer and for the concealing means; and a structured transparent adhesive varnish applied to the rear side of said film layer in the edge region of said separating color layer.

17. The printing carrier according to claim 7, further comprising:

a carrier layer having a color and including a front side, said carrier layer carrying the concealing means on the front side wherein the color of said carrier layer differs from the color of said concealing means;

an adhesive layer securing said transparent film layer onto said concealing means, said transparent film layer being separable at the front side of the carrier layer; and a structured separating varnish located between concealing means and said carrier layer;

wherein the adhesive force between said concealing means and said adhesive layer on the one hand as well as between said concealing means and said carrier layer on the other hand is in each case greater than the adhesive force of said adhesive layer vis-à-vis said transparent film layer and that it is again greater than the adhesive force of said structured separating varnish vis-à-vis said carrier layer or said concealing means; and wherein the cohesion of said adhesive layer is greater than the adhesive force of said adhesive layer vis-à-vis said transparent film layer.

18. The printing carrier according to claim 1 further comprising-a reagent color discoloring irreversibly under the impact of heat and/or solvent.

19. The printing carrier according to claim 1, wherein said at least one structure imprint forms a micro-topography comprising elevations on said transparent film layer.

20. The printing carrier according to claim 5, wherein said at least one structure imprint comprises a third affinity vis-à-vis an adjacent underlying layer;

wherein the area of said upper surface not covered by said at least one structure imprint has a fourth affinity vis-à-vis toner or ink suitable for printing confidential information; and wherein the third affinity is lower than the fourth affinity.

21. The printing carrier according to claim 1, further comprising a reagent color including an absorber for infrared and/or ultraviolet radiation.

* * * * *